3,019,249
SYNTHESIS OF PARTIAL ESTERS OF PHOSPHO-
RUS ACIDS AND SALTS THEREOF
Frank C. Gunderloy, Jr., Menlo Park, N.J., assignor to
Esso Research and Engineering Company, a corporation of Delaware
No Drawing. Filed Apr. 22, 1959, Ser. No. 807,974
9 Claims. (Cl. 260—461)

The present invention relates to exchange reactions between organic phosphorus compounds having two or more ester groups and phosphorus acids or alkali metal salts of such acids. The term exchange reactions as used herein is meant to include reactions wherein one or more —OR groups (where R is an organic radical) of the esterified phosphorus compound are exchanged for —OH groups or —OK groups (where K is an alkali metal) of a corresponding structurally similar phosphorus acid or salt thereof. More particularly, this invention relates to the synthesis of di- or mono-substituted phosphites or phosphates in high yields by reacting one mole of a tri-substituted phosphite or phosphate with respectively two or one-half moles of the corresponding structurally similar phosphorus acid. Additionally, this invention relates to the preparation of alkali metal salts of di-substituted phosphites by reacting a tri-substituted phosphite with an alkali metal salt of phosphorous acid. By mono-, di- or tri-substituted phosphites or phosphates in this specification is meant phosphites in which alkyl, aryl or substituted alkyl or aryl groups have been substituted for OH radicals of the corresponding phosphorus acid. A further embodiment of this invention relates to the synthesis of mono-esters of phosphonic acids by reacting diesters of phosphonic acids with a phosphonic acid.

Although tri-substituted phosphites are readily prepared in high yield, synthesis of mono- and di-substituted phosphites has been more complicated, most methods giving mixtures of these compounds and thus poor yields of a single desired compound. For example, according to the preferred prior art method of preparation of these materials, chlorophosphites are first prepared by reacting PCl₃ with an alcohol or a phenol, and these chlorophosphites are then hydrolyzed to a mixture of mono- and diesters. In this synthesis it is difficult to maintain suitable reaction conditions so that a desired mono- or di-chlorophosphite will be obtained in high yield, since the alcohol or phenol will not substitute selectively for the same number of chlorine atoms on each PCl₃ molecule. Mixtures of tri-substituted phosphite, mono- and di-halophosphites, and unreacted PCl₃ are obtained. Although yields of some individual halophosphites can be improved by adding a tertiary amine to take up HCl as it is formed in this reaction, this introduces an expensive third component into the system, and the resultant amine hydrochloride must be separated at the end of the reaction. Alternately, the alkali metal salt of an alcohol may be used in the initial reaction with PCl₃, but this necessitates the additional synthesis of such a salt, and the formation of desired phosphites is still not selective. Obviously, the present invention is much simpler than the preferred prior art processes. Thus, phosphorous acid is easily made and is sold commercially, and tri-substituted phosphites are obtained in high yields by the reaction of a slight excess of an alcohol or a phenol with PCl₃ to obtain complete substitution for the chlorine atoms. The triester and the acid are reacted in the present invention to give selectively either a mono-substituted or a di-substituted phosphite in essentially quantitative yield.

The preparation of mono- or di-substituted phosphates from phosphorus oxychloride (POCl₃) reactions suffers from the same drawbacks as described for PCl₃ reactions above. Another common prior art method for the preparation of partially substituted phosphates is the reaction of an alcohol or phenol with P₂O₅ or H₃PO₄. This is again a non-selective process, and mixtures of both mono- and di-substituted phosphates are always formed regardless of the proportions of the initial reactants. By the method of the present invention, mono- or di-substituted phosphates may be obtained as desired, and the starting materials, phosphoric acid and tri-substituted phosphates, are easily and economically prepared on a large commercial scale.

With respect to the preparation of alkali metal salts of di-substituted phosphites, all the prior art methods require the use of free alkali metals, either directly or one step removed as the alkoxides. The method of the present invention avoids the difficulty involved in handling the free metal and also the large volumes of solvent generally used to moderate the prior art reactions.

Thus, it has now been found that mono- and di-substituted derivatives of phosphorus acids may be prepared selectively and in good yield by exchange reactions between the tri-substituted compounds and the corresponding free acid, its salt or mono-substituted derivative according to the product desired.

The various embodiment processes of the present invention may be more clearly understood from a consideration of the following equations illustrating the reactions taking place:

For synthesis of mono-substituted phosphites:

$$(RO)_3P + 2H_3PO_3 \rightarrow 3ROP(O)(OH)H$$

For synthesis of di-substituted phosphites:

$$2(RO)_3P + H_3PO_3 \rightarrow 3(RO)_2P(O)H$$

For synthesis of mono-substituted phosphates:

$$(RO)_3PO + 2H_3PO_4 \rightarrow 3ROP(O)(OH)_2$$

For synthesis of di-substituted phosphates:

$$2(RO)_3PO + H_3PO_4 \rightarrow 3(RO)_2P(O)OH$$

For synthesis of alkali metal salts of di-substituted phosphites:

$$2(RO)_3P + K_2HPO_3 \rightarrow 2(RO)_2P(O)K + (RO)_2P(O)H$$

For synthesis of mono-esters of phosphonic acids:

$$R'P(O)(OR)_2 + R'P(O)(OH)_2 \rightarrow 2R'P(O)(OR)OH$$

In these equations, R is an alkyl, substituted alkyl, aryl, or substituted aryl group, and R' is also an alkyl, substituted alkyl, aryl, or substituted aryl group, and K is an alkali metal. It should be noted that while R is described only as a single type of alkyl or aryl group, it is contemplated that mixtures of different types of groups can also be used. In the above reactions it can be seen that in each case an exchange reaction occurs between either the tri-substituted phosphites and the corresponding phosphorous acid or salt thereof, or between tri-substituted phosphates and the corresponding phosphoric acid, or between diesters of phosphonic acids and the corresponding phosphonic acid. In this specification, corresponding phosphorus-containing acid therefore refers to phosphorous acid when phosphites are reacted, phosphoric acid when phosphates are reacted, and phosphonic acid when phosphonates are reacted. The phosphorus materials of the present invention have many uses, for example as plasticizers and as gasoline additives.

In the above reactions, the alkyl groups may be C₁ to C₁₀ or higher, and the aryl groups may be phenyl or substituted aryl groups such as tolyl, xylyl, ethylphenyl, nonylphenyl, p-chlorophenyl, and the like. Obviously, mixed tri-substituted esters may be used as the starting materials, but ordinarily it is preferred to utilize esters in which the three —OR groups are the same as illustrated above.

The present process is surprising in that it was thought according to the prior art that phosphorus acids and their derivatives that have at least one acid function were all in the pentavalent form, as shown by the following structural formulas:

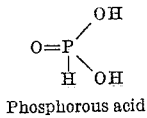

Phosphorous acid

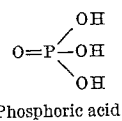

Phosphoric acid

As pentavalent phosphorus derivatives, these acids have no readily evident point of attack at the phosphorus atom for exchange reactions as described in the method of this invention. Their reactions known in the prior art are characteristic of acids, involving hydrogen ions and phosphorus containing cations, rather than the —OH groups as indicated by the present invention process. Additionally, it is surprising that by the present process high yields of respectively either the mono- or di-substituted ester can be obtained merely by adjusting the proportions of reactants used. In exchange reactions involving simple equilibration of unlike groups, a statistical distribution of all possible intermediate products is usually obtained.

Temperatures utilized for the reactions should be from 0° C., or lower, if aqueous acids are used, and there is indication of excessive occurrence of hydrolytic side reactions, to the decomposition temperature of the desired ester, e.g., 130° C. for mono-n-butyl phosphite and 150° C. for monophenyl phosphite. Pressures are not critical and may be in the range of 0.1 mm. Hg to 200 atmospheres, preferably, for economy, atmospheric pressure. Reaction times are in the range of several minutes to 72 hours. Aqueous acid solutions may be used, but it is preferable to have concentrations in the range of 80–100% by weight, in order to prevent excessive hydrolytic attack on the ester linkages, and to avoid separation of large amounts of water from the final products. With respect to utilizing salts of the acids, generally higher temperatures than are used with the respective acids are preferred along with anhydrous conditions. It should additionally be noted that, in the case of phosphites, it is possible to obtain both mono- and di-substituted phosphites at the same time, if both are desired, by using a molar ratio of the corresponding acid somewhere between 2 and ½, and that efficient separation of the di-substituted phosphite may then be obtained by distillation, since the mono-substituted phosphites do not distill overhead.

The present invention will be further defined and illustrated from a consideration of the following examples reporting results of preparations carried out in the laboratory.

EXAMPLE 1

*Synthesis of mono-n-butyl phosphite*

25.0 gms. (0.1 mol) of tri-n-butyl phosphite and 16.4 gms. (0.2 mol) of solid phosphorous acid are mixed and reacted with stirring over a steam bath for several hours. The result is a totally liquid product. Attempted distillation at 0.05 mm. Hg gives no distillate over the range 25°–130° C., showing that no unreacted tri-n-butyl phosphite remains, and no di-n-butyl phosphite has formed. The entire 41.4 gms. of product is thus mono-n-butyl phosphite (0.3 mol, quantitative yield). At temperatures over 130° C., under the attempted distillation conditions noted above, decomposition occurs, as is characteristic of mono-substituted phosphites.

EXAMPLE 2

*Synthesis of monophenyl phosphite*

31.0 gms. (0.1 mol) of triphenyl phosphite and 16.4 gms. (0.2 mol) of solid phosphorous acid are mixed and reacted with stirring on a steam bath for several hours. Two liquid layers form as the acid first melts, but these merge to one homogeneous liquid as the reaction progresses. No solid separates upon cooling. Attempted distillation of the product at 0.05 mm. Hg over the range 25° C. to 150° C. gives no distillate, showing that no unreacted triphenyl phosphite remains, and that no diphenyl phosphite has formed. The entire 47.4 gms. of product is thus monophenyl phosphite (0.3 mol, quantitative yield). At temperatures over 150° C., under conditions described for attempted distillation above, decomposition occurs, as is characteristic of mono-substituted phosphites.

EXAMPLE 3

*Synthesis of di-n-butyl phosphite*

50.1 gms. (0.2 mol) of tri-n-butyl phosphite and 8.2 gms. (0.1 mol) of solid phosphorous acid are mixed and reacted with stirring on a steam bath for two hours. Distillation of the liquid product gives 55.4 gms. (0.285 mol, 95% yield) of di-n-butyl phosphite, boiling 87°–88° C. at 2 mm. Hg. (Boiling point, extrapolated from literature values, is 85°–95° C. at 2 mm. Hg. See G. M. Kosolapoff, Organophosphorus Compounds, p. 202.)

EXAMPLE 4

*Synthesis of diphenyl phosphite*

62.1 gms. (0.2 mol) of triphenyl phosphite and 8.2 grams (0.1 mol) of solid phosphorous acid are mixed and reacted with stirring on a steam bath for two hours. Two liquid layers are formed as the acid melts, but these merge to one homogeneous liquid as the reaction progresses. No solid separates upon cooling. Distillation of the product gives 67.6 gms. (0.288 mol, 96% yield) of diphenyl phosphite, boiling 129°–130° C. at 0.05–0.06 mm. Hg. (Boiling point, extrapolated from literature value, is 125° to 135° C. at 0.05 mm. Hg. See Kosolapoff, op. cit., p. 203.)

EXAMPLE 5

*Synthesis of potassium di-n-butyl phosphite*

50.1 gms. (0.2 mol) of tri-n-butyl phosphite and 15.8 gms. (0.1 mol) of potassium monohydrogen phosphite (K$_2$HPO$_3$) are stirred together and heated for 24 hours at 200°–230° C., under a nitrogen atmosphere. Two liquid layers form, the lower of which solidifies upon cooling. The remaining liquid di-n-butyl phosphite is extracted with hexane, and the residual solid dried in vacuo. 40.0 gms. (0.172 mol, 86% yield) of potassium di-n-butyl phosphite, a crystalline hygroscopic solid, are obtained.

EXAMPLE 6

*Synthesis of potassium diphenyl phosphite*

62.1 gms. (0.2 mol) of triphenyl phosphite and 15.8 gms. (0.1 mol) of potassium monohydrogen phosphite are stirred together and heated to 200° to 230° C. for 24 hours. Two liquid layers form, the lower solidifying upon cooling. Extraction of the liquid diphenyl phosphite with hexane and drying the solid in vacuo yields 46.5 gms. (0.171 mol, 85.5% yield) of potassium diphenyl phosphite, a crystalline, hygroscopic solid.

EXAMPLE 7

*Synthesis of mono-n-butyl phosphate*

26.6 gms. (0.1 mol) of tri-n-butyl phosphate is chilled in an ice bath, and 22.5 gm. (0.2 mol) of 87 wt. percent aqueous phosphoric acid is stirred into it over a period of a few minutes. The mixture is cloudy, and separates into two liquid layers upon warming to room temperature.

The mixture is distilled for 20 hours at 0.1 mm. Hg and room temperature, receiving the distillate in a −80° C. trap. 2.9 cc. of water and a trace of unreacted tri-n-butyl phosphate are recovered from the −80° C. trap, and continued distillation for five hours under the same conditions yields no further distillate. Attempted distillation of the remaining homogeneous liquid at 0.1 mm. Hg over the range 25° to 135° C. gives no distillate, showing no unreacted tri-n-butyl phosphate to be present. The 46.1 gms. of product is thus mono-n-butyl phosphate (0.299 mol, 99.5% yield). In the attempted distillation, this ester begins to decompose at about 100° C., as is characteristic of mono-substituted phosphates.

EXAMPLE 8

*Synthesis of di-n-butyl phosphate*

53.3 gms. (0.2 mol) of tri-n-butyl phosphate is chilled in an ice bath, and 11.3 gms. (0.2 mol) of 87 wt. percent aqueous phosphoric acid added over a period of a few minutes. The mixture is initially cloudy, but clarifies when warmed to room temperature. Distillation at 0.1 mm. Hg and room temperature yields 1.5 cc. of water and a trace of unreacted tri-n-butyl phosphate, isolated in a −80° C. trap. Continuation of these distillation conditions for two more hours yields no further distillate. Attempted distillation at 0.1 mm. Hg over the range 25° C. to 135° C. gives no distillate, showing no unreacted tri-n-butyl phosphate remains. The 63.0 gms. of product is thus di-n-butyl phosphate (0.299 mol, 95.5% yield). In the attempted distillation, this ester begins to decompose at about 100° C., as is characteristic of di-substituted phosphates.

EXAMPLE 9

*Synthesis of mono-n-butyl n-butyl phosphonate*

25.0 gms. (0.1 mol) of di-n-butyl n-butyl phosphonate and 13.8 gms. (0.1 mol) of n-butyl phosphonic acid are mixed together and heated to 120° to 130° C. overnight. The product is a tan liquid, which will not distill at 140° C. and 0.1 mm. Hg. (If the mixture is heated to only 100° C. for two hours, di-n-butyl n-butyl phosphonate is recovered unchanged under these distillation conditions.) Heating above 140° C. brings about decomposition. Since no weight loss occurs in the reaction, the yield of mono-n-butyl n-butyl phosphonate is quantitative (38.8 gms., 0.2 mol).

EXAMPLE 10

*Synthesis of monophenyl phenyl phosphonate*

31.0 gms. (0.1 mol) of diphenyl phenyl phosphonate and 15.8 gms. (0.1 mol) of phenyl phosphonic acid are mixed and heated on a steam bath for four hours, first forming a thick paste, and finally a clear homogeneous liquid. Upon cooling, the product is at first a viscous oil, but it totally crystallizes upon standing. A quantitative yield (46.8 gms., 0.2 mol) of monophenyl phenyl phosphate, melting point 57° C., is obtained. (Literature value for melting point is 57° C., Michaelis, Ann., 181, 265 (1876).)

What is claimed is:

1. A process for preparing phosphates selected from the group consisting of monosubstituted and disubstituted phosphates which comprises reacting a trisubstituted phosphate having the general formula $$(RO)_3PO$$

wherein R is a radical selected from the group consisting of $C_1$–$C_{10}$ alkyl groups and phenyl, tolyl, xylyl, ethyl phenyl, nonyl phenyl and p-chlorophenyl groups, with aqueous phosphoric acid at temperatures below that temperature at which substantial hydrolytic side reactions occur.

2. A process for preparing disubstituted phosphates which comprises reacting a trisubstituted phosphate having the general formula $$(RO)_3PO$$

wherein R is a radical selected from the group consisting of $C_1$–$C_{10}$ alkyl groups and phenyl, tolyl, xylyl, ethyl phenyl, nonyl phenyl and p-chlorophenyl groups, with aqueous phosphoric acid in a molar ratio of about 2:1 at temperatures below that temperature at which substantial hydrolytic side reactions occur.

3. A process for preparing monosubstituted phosphates which comprises reacting a trisubstituted phosphate having the general formula $$(RO)_3PO$$

wherein R is a radical selected from the group consisting of $C_1$–$C_{10}$ alkyl groups and phenyl, tolyl, xylyl, ethyl phenyl, nonyl phenyl and p-chlorophenyl groups, with aqueous phosphoric acid in a molar ratio of about 0.5:1 at temperatures below that temperature at which substantial hydrolytic side reactions occur.

4. The process of claim 2 in which the tri-substituted phosphate is tri-n-butyl phosphate and a product of the reaction is di-n-butyl phosphate.

5. The process of claim 3 in which the tri-substituted phosphate is tri-n-butyl phosphate and a product of the reaction is mono-n-butyl phosphate.

6. The process of claim 1 in which the three R radicals in the formula are the same radical.

7. The process of claim 1 in which the aqueous acid concentration is 80 to 87 wt. percent.

8. A process for preparing a phosphate selected from the group consisting of monosubstituted and disubstituted phosphates which comprises reacting a trisubstituted phosphate having the general formula $$(RO)_3PO$$

wherein R is a radical selected from the group consisting of $C_1$–$C_{10}$ alkyl groups; and phenyl, tolyl, xylyl, ethyl phenyl, nonyl phenyl and p-chlorophenyl groups with 80 to 87 wt. percent aqueous phosphoric acid at temperatures not exceeding room temperature and approximately atmospheric pressure for up to a few minutes.

9. A process for preparing a phosphate selected from the group consisting of monoalkyl and dialkyl phosphates which comprises reacting a trialkyl phosphate having 1–10 carbon atoms in each alkyl group with 80–87 wt. percent aqueous phosphoric acid at temperatures not exceeding room temperature in a molar ratio of about 0.5 to 2:1 and at approximately atmospheric pressure for up to a few minutes.

References Cited in the file of this patent

UNITED STATES PATENTS 2,834,797    Chadwick _____ May 13, 1958

FOREIGN PATENTS 566,281    Canada _____ Nov. 18, 1958

OTHER REFERENCES

Higgins et al.: J. Org. Chem., 21, 1156–59 (1956), cited in Chem. Abst., 52, 19166 (1958).